No. 731,563.

Patented June 23, 1903.

UNITED STATES PATENT OFFICE.

JOHN C. HALEY, OF WASHINGTON, DISTRICT OF COLUMBIA, ASSIGNOR OF ONE-HALF TO JOHN C. PENNIE, JOHN A. GOLDSBOROUGH, AND CHARLES J. O'NEILL, OF WASHINGTON, DISTRICT OF COLUMBIA.

SOLUBLE COCOA AND PROCESS OF MAKING SAME.

SPECIFICATION forming part of Letters Patent No. 731,563, dated June 23, 1903.

Application filed March 15, 1901. Serial No. 51,355. (No specimens.)

*To all whom it may concern:*

Be it known that I, JOHN C. HALEY, a citizen of the United States, residing at Washington, District of Columbia, have invented certain new and useful Improvements in the Preparation of Chocolate; and I do hereby declare the following to be a full, clear, and exact description of the invention, such as will enable others skilled in the art to which it appertains to make and use the same.

My invention relates to an improved cocoa product and to the process or method of making or preparing the same.

The object of my invention is to provide a process of separating the oleaginous constituents of the cocoa, commonly called "cocoa-butter," from the albuminoid and non-oleaginous ingredients thereof, emulsifying the oleaginous constituents thus separated, and incorporating this emulsion with the non-oleaginous constituents to produce a resultant compound that is soluble in either hot or cold liquids, (as water or milk,) that is easily and thoroughly digestible, that is capable of being employed in various combinations to form pleasant, nutritious, and wholesome food products and beverages, and that is susceptible of all the uses of ordinary commercial cocoa, while possessing none of the objectionable properties of the latter. The oleaginous constituents, which form a large proportion of the commercial article, are highly nutritious, but are not particularly wholesome when taken in their normal combination with the other elements. Hence it is the common practice to separate and remove these constituents from the cocoa and use the latter alone. Cocoa thus prepared lacks the nourishing properties and the peculiarly delicious flavor which the oleaginous constituents impart to it, and it is therefore desirable to retain the oleaginous constituents in whole or in part and to counteract their otherwise deleterious effects. To this end in carrying out my invention I take a certain proportion of cocoa, preferably the cocoa of commerce, which contains the normal amount of oleaginous constituents, and melt the same on a water-bath or in any other suitable manner and add thereto glycerin previously heated to about 100° Fahrenheit in the proportion, by weight, of one part of glycerin to eight parts of cocoa. This mixture I stir or rub thoroughly and until the mass thickens and becomes stiff. I then add separately to the mixture two more portions of heated glycerin, each equal to the first portion, and continue the rubbing or stirring after each addition until the oleaginous constituents are separated from the pasty mass resulting from the union of the glycerin and the albuminoid or non-oleaginous portion of the cocoa. After this separation has been effected the oleaginous matter may be removed from the mass, by compression or otherwise, for separate treatment, to be hereinafter described, or it may be left in the mass, distributed therethrough in a free state. In the latter case I add to the melted mass four or five parts, by weight, of "simple syrup" (syrup simplex, *United States Pharmacopœia*) or equivalent emulsifier, also preferably heated to about 100° Fahrenheit, and stir or rub the mixture until a smooth homogeneous product results. The effect of this last operation is to form an emulsion with the free oleaginous constituents and the syrup, which emulsion is incorporated with and distributed throughout the mass of the cocoa. The product resulting is in suitable form for general use and may be molded into cakes or packed in tins to be kept indefinitely without any tendency to become rancid. In this form it is readily soluble in either hot or cold liquids, and preserving, as it does, the peculiar natural flavor of the cocoa, it forms a delicious food product without the least apparent oiliness or greasiness.

In the modified treatment when the non-oleaginous constituents of the cocoa are removed from the heated mass I emulsify the oleaginous constituents separately by stirring or rubbing them with the requisite portions of simple syrup or equivalent emulsifier, preferably under the influence of heat, and after the emulsification has been completed I add the resultant emulsion in quantities to suit to the separated cocoa and thoroughly incorporate the elements. This product, which is practically identical with that resulting from the alternative treatment, may be employed in precisely the same manner as the latter.

While I have described only the use of syrup simplex in the emulsification of the oily constituents of the cocoa, it will be understood that I may employ for this purpose any other equivalent liquid possessing the requisite viscosity to cause the oily matter to emulsify. Among such vehicles which I have thus employed as a substitute for syrup simplex, though with less advantage, are, for instance, glucose or honey or "starch mucilage"—i. e., an infusion of starch in water.

By my process I produce a cocoa product which presents all of its nutritive constituents in the best possible form for assimilation, which preserves all of the natural flavor of the cocoa, and which is devoid of free oily or fatty matter.

What I claim is—

1. The process of preparing or treating cocoa which consists in separating the oleaginous from the non-oleaginous constituents, emulsifying the oleaginous constituents, and after such emulsification, incorporating them with the non-oleaginous constituents.

2. The process of producing soluble cocoa which consists in melting the cocoa, separating the oleaginous from the non-oleaginous constituents, emulsifying the oleaginous constituents by the addition of a syrup, and incorporating them with the non-oleaginous constituents.

3. The process of producing soluble cocoa which consists in melting the cocoa, separating the oleaginous from the non-oleaginous constituents by the addition of glycerin, emulsifying the oleaginous constituents by the addition of a syrup, and incorporating them with the non-oleaginous constituents.

4. The process of producing soluble cocoa which consists in melting the cocoa, separating the oleaginous from the non-oleaginous constituents by mixing with successive portions of glycerin, emulsifying the oleaginous constituents by the addition of a syrup and incorporating them with the non-oleaginous constituents.

5. A soluble cocoa product containing the normal constituents of cocoa and added glycerin, the oleaginous constituents of said cocoa being present in the form of an emulsion.

6. A soluble cocoa product containing the normal constituents of cocoa and added glycerin, the oleaginous constituents of said cocoa being present in the form of an emulsion with syrup.

In testimony whereof I affix my signature in presence of two witnesses.

JOHN C. HALEY.

Witnesses:
HUGH M. STERLING,
CHAS. J. O'NEILL.